United States Patent Office 3,824,232
Patented July 16, 1974

3,824,232
PROCESS FOR MANUFACTURING WATER SOLUBLE ALKOXYLATED METHYLOL MELAMINES
Gunter Pusch, Leitershofen, near Augsburg, and Dieter Walz, Heinhofen, near Augsburg, Germany, assignors to Chemische Fabrik Pfersee G.m.b.H., Augsburg, Germany
No Drawing. Filed Feb. 2, 1971, Ser. No. 112,073
Claims priority, application West Germany, Feb. 5, 1970, P 20 05 166.5
Int. Cl. C07d 55/32
U.S. Cl. 260—249.6                    6 Claims

ABSTRACT OF THE DISCLOSURE

A process for producing water soluble alkoxylated methylol melamines which comprises heating in the first stage in the presence of alkalis 1 mol melamine with 2 to 6 mols paraformaldehyde in 0.4 to 1.2 mols of a bivalent or tervalent alcohol with a total of 2 to 6 carbon atoms, whereby up to 60% by weight of the polyalcohol can be exchanged with at least the same amount by weight of a low univalent aliphatic alcohol used for alkoxylation in the second stage. The heating continues until an opalescent to clear solution is produced. Immediately thereafter in the second stage after the addition of excessive low univalent aliphatic alcohol the solution is acidly alkoxylated in the usual manner and neutralized. Possibly the excessive univalent alcohol is distilled off.

---

This invention relates to a process for manufacturing water soluble alkoxylated methylol melamines and to methylol melamines manufactured in accordance with this process.

It is already known that water soluble methylol melamines alkoxylated with low valent alcohols can be produced by reacting melamine with aqueous formaldehyde solutions at a neutral to alkaline pH value until methylol melamine is produced, whereupon water is removed in a careful manner. This careful removal of water can be carried out by an azeotrope distilling of water with alcohols or, preferably, by spray drying of solutions. Methylol melamines thus produced which are substantially free from water, are then alkoxylated with low valent alcohols while adding acid catalysts, they are neutralized after alkoxylation and possibly excess alcohol is distilled off.

An important drawback of this process involves the production of substantially water free methylol melamines. During water removal by azeotrope distillation very large amounts of corresponding organic solvents are produced which must be recovered in a suitable manner. On the other hand very expensive devices are required for spray drying.

It is also known to carry out alkoxylation of methylol melamines with excessive alcohol and acid catalysts in the presence of water. However, these processes can be only carried out for penta-to-hexa-methylol melamine and in the case of these higher methylolized products the process has to be operated very carefully to avoid an undesired further condensation of methylol melamines. In the case of methylol melamines which contain per mol melamine 4 or less methylol groups, this process actually cannot be carried out since these products quickly further condense when acid is added and thus result in products which are more or less water insoluble.

An object of the present invention is to eliminate these drawbacks of existing processes.

Other objects will become apparent in the course of the following specification.

In the accomplishment of the objectives of the present invention it was found that water soluble alkoxylated methylol melamines can be produced in a simple manner by heating in the first stage in the presence of alkalis 1 mol melamine with 2 to 6 mols paraformaldehyde in 0.4 to 1.2 mols of a bivalent or tervalent alcohol with a total of 2 to 6 carbon atoms, whereby up to 60% by weight of the polyalcohol can be exchanged with at least the same amount by weight of a low univalent alcohol used for alkoxylation in the second stage; the heating continues until an opalescent to clear solution is produced and directly thereafter in the second stage after the addition of excessive low univalent aliphatic alcohol the solution is acidly alkoxylated in the usual manner, neutralized and possibly the excessive univalent alcohol is distilled off.

The bivalent or tervalent alcohol with a total of 2 to 6 carbon atoms is used in amounts ranging from 0.4 to 1.2, preferably 0.7 to 1.1 mol per mol melamine. By way of example such polyalcohols may consist of ethylene glycol, diethylene glycol, propylene glycol, dipropylene glycol, butylene glycol and glycerin. Preferably ethylene glycol is added.

A specially preferred working of the process of the present invention consists in that up to 60% by weight of the above-mentioned polyalcohols are exchanged for the low univalent aliphatic alcohol introduced in the second stage for alkoxylation in at least the same amount by weight, but preferably about double the amount by weight. Preferably about 10% to 50% by weight of polyalcohol are thus exchanged. The then introduced amount of low alcohol can exceed the amount of substituted polyalcohol since this results in a liquid which is thinner and thus more capable of reaction.

In the reaction of melamine with paraformaldehyde in the above-mentioned polyalcohols in the first stage as alkalis are used specifically sodium- or potassium hydroxide as well as alkali carbonates. However, it is also possible to use organic bases, specifically low trialkanol- or trialkylamines, for example triethanolamine or triethylamine. The pH value, measured after dilution of one part of the reaction mixture of the first stage with ten parts water, should be above 8, specifically it should be between 8.5 and 10. After the fixing of the pH value the reaction mixture is heated to temperatures of preferably above 80° C., specifically 85° C. to 100° C. However, the methylolation temperature should, if possible, not exceed 140° C. The mixture is allowed to stand at the desired reaction temperature, specifically at 85° C. to 100° C. until it becomes approximately clear. As soon as a nearly clear solution is present, the low univalent aliphatic alcohol is promptly added in the second stage. As alcohol technical methanol and ethanol are to be considered, while propanol is somewhat less suitable. Preferably methanol is used; it is advantageous, however, to cool the reaction mixture prior to its addition to temperatures below 85° C. to avoid loss of alcohol through its evaporation during the addition. The amount of alcohol used for alkoxylation should be more than 6 mols per mol melamine, specifically 8 to 20 mols per mol melamine. Thus, in the case of low methylolated methylol melamines a larger excess is generally used than in the case of high methylolated methylol melamines. After the addition of alcohol the pH value (measured in dilution of 1 part of alcoholic reaction mixture with 10 parts water) is set by a medium strong to strong acid to a value below 6.5, specifically 4.5 to 6.2. As acids preferably strong or medium strong inorganic acids are used, such as muriatic acid, sulphuric acid or phosphoric acid. However, strong to medium strong organic acids can be also successfully used, such as maleic acid, monochlor-acetic acid, trichlor-acetic acid or dicarbonic acids with a total of 2 to 5 carbon atoms. Alkoxylation takes place at about 50° C. to 80° C. and continues until a clear or opalescent product is produced, which usually takes place in 5 to 25 minutes. Thereupon the reaction mixture is set to a pH value of 7.2 to 8.5 (also measured after dilution of 1:10 with water) and possibly the excessive alcohol is distilled off.

The process of the present invention is particularly characterized in that the methylolization in the first stage takes place substantially in the absence of water and therefore especially methylol melamines, which contain bound per mol melamide 4 or less mols formaldehyde in the form of methylol groups, can be changed without drying into corresponding water soluble alkoxylated methylol melamines. The manufacture of alkoxylated di- to tetra-methylol melamines according to the process of the present invention is thus particularly preferred. It should be stressed that in the case of high methylolated compounds the process of the present invention requires only a smaller excess of alcohol used for alkoxylation than is the case in known alkoxylation processes carried out without intermediate drying. Finally, a particular advantage of the process of the present invention consists in that the alcohol recovered through off distillation, is substantially free of water and, consequently, can be immediately reused.

It could not be anticipated that by the use of the above-mentioned polyalcohols in the above-mentioned amounts it would be possible to carry out the reaction of melamine with paraformaldehyde and alkali as catalyst in such a simple and quick manner. The results of the present invention are particularly surprising, since it is not possible to carry out methylolization of melamine with paraformaldehyde in the univalent aliphatic low alcohols used for the alkoxylation since comparative experiments have shown that the speed of reaction of melamine with paraformaldehyde in the presence of univalent alcohols and when alkalis are used as catalyst, is so slow that a further condensation of produced methylol compounds is unavoidable due to the long heating required for the complete reaction. However, despite the low speed of reaction in the univalent low alcohol, it is possible to exchange up to 60% by weight of polyalcohol against the alcohol used in the second stage for alkoxylation. Thus it must be regarded as particularly surprising that precisely the exchange of one part of polyalcohol for alcohol which influences the reaction speed of melamine with paraformaldehyde should be considered as a greatly preferred embodiment of the process of the present invention, since in case of a complete exchange of polyalcohol highly condensed water insoluble products are produced.

The alkoxylated methylol melamines thus produced are used in the usual manner. They are particularly suitable for making crease resistance textiles from cellulose fibers, grip providing means during treatment of materials from synthetic fibers, for example, surface formations from polyamide or polyester fibers, or also additional products for glue masses.

The following examples are given by way of exemplification only:

EXAMPLE 1

In a three-neck flask of 2 liters capacity provided with a stirrer, a thermometer and a return flow cooler are introduced 150 gr. ethylene glycol. 252 gr. melamine and 190 gr. paraformaldehyde (96%) and the pH value is set to 9.0 with 1 ml. of a 25% soda lye (measured after dilution of one part of the reaction mixture with 10 parts water). The temperature is quickly raised to 95° C. and the reaction mixture is left for 20 minutes at that temperature. After a practically clear product has been produced, it is cooled to 80° C. and mixed with 640 gr. methanol. Then the pH value is set at 6.2 with 8 ml. concentrated muriatic acid (measured after dilution of 1:10 with water) and the reaction product is alkoxylated for 12 minutes at 60° C. After neutralizing to a pH of 7.8 with a 25% soda lye the excessive methanol is distilled off to a great extent and a clear water soluble product is obtained which can be diluted with water to any extent.

It is particularly advantageous when about 20% of ethylene glycol are exchanged for 60 gr. methanol and then melamine is methylolized in the indicated manner.

EXAMPLE 2

In a three-neck flask of 2 liters capacity is introduced a mixture of 110 gr. ethylene glycol, 90 gr. technical methanol, 252 gr. melamine and 145 gr. paraformaldehyde (96%) and the pH value is set with 1 ml. of 25% potash lye to 9.0 (measured after dilution of 1:10 with water). This reaction mixture is quickly heated to reflux (about 86° C.) and is stirred at that temperature until a substantially clear solution is produced (about 5 to 8 minutes). After cooling to 70° C. 640 gr. of technical methanol is added, the pH value is set with concentrated muriatic acid to 5.3 (measured after 1:10 dilution with water) and the reaction product is alkoxylated at 60° C. for about 8 minutes. Thereupon the reaction mixture is neutralized (pH equal to 8.5), the excessive alcohol is distilled off to a great extent and an opal water-soluble product is obtained which can be diluted with water to any extent.

EXAMPLE 3

In a glass goblet of 2 liters capacity provided with a stirrer and a thermometer is introduced a mixture of 150 gr. glycerin, 252 gr. melamine and 313 gr. paraformaldehyde (96%) and the mixture is set with 5 ml. triethanolamine to a pH of about 8.5 (measured after dilution of one part of the reaction mixture with 10 parts water). The mixture is then quickly heated to about 95° C. and after about 20 minutes a nearly clear product is obtained. Thereupon the reaction mixture is cooled to about 75° C., about 640 gr. methanol are added, the pH is set to 5.6 with maleic acid (measured after dilution of 1:10 with water) and the mixture is alkoxylated for about 12 minutes at about 60° C. After neutralization (pH of 7.6) with a 25% soda lye and the removal by distillation of excess alcohol a substantially clear water soluble product is obtained which can be diluted with water as desired.

In a similar manner 360 gr. paraformaldehyde can be added in the first stage and the same amount of methanol can be added during alkoxylation in the second stage to produce a water soluble alkoxylated hexamethylol melamine.

Maleic acid used for acidification in the second stage can be replaced, for example, with succinic acid.

EXAMPLE 4

In a three-neck flask of 2 liters capacity provided with a thermometer, a return flow cooler and a stirrer is introduced a mixture of 150 gr. diethylene glycol, 252 gr. melamine and 250 gr. paraformaldehyde (96%) and the mixture is set to a pH value of about 9 with 1.5 gr. water free soda (measured after dilution of 1:10 with water). After heating to 120° C. the mixture is stirred for 15 minutes at that temperature. The clear reaction product which is thus produced is cooled to about 90° C. and 1100 gr. ethyl alcohol are added to it. The pH value is set to about 5.5 with 3 gr. trichloracetic acid (measured after dilution of 1:10 with water) and the mixture is alkoxylated at about 50° C. for about 20 minutes. The reaction mixture thus produced is then neutralized, the excess alcohol is distilled off under reduced pressure and an opalescent water soluble product is produced which can be mixed at will with water.

An equally good alkoxylated tetramethylol melamine is produced if 50% of the diethylene glycol are replaced by 120 gr. ethyl alcohol. The methylolization of the first stage can then take place at 90° C. to 100° C.

EXAMPLE 5

In a glass goblet provided with a stirrer and a thermometer is introduced a mixture of 140 gr. propene diol (1.2), 252 gr. melamine and 190 gr. of a 96% paraformaldehyde. The mixture is set to a pH value of 10.0 by the addition of triethylamine (measured after dilution of 1:10 with water) and after being heated to about 100° C. is stired for about 15 minutes at that temperature. The reaction mixture is treated with 1450 gr. propanol and half concentrated sulphuric acid (pH value 5.8 after a 1:10 dilution with water) and the alkoxylation of the methylol melamine thus produced takes place at about 65° C. After usual neutralization a water soluble substantially clear product is otbained.

EXAMPLE 6

The procedure is the same as in example 4, but in the first stage as polyalcohol are used 230 gr. of dipropylene glycol having the formula

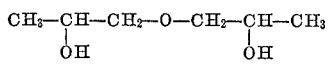

Furthermore, a 25% soda lye is used to set the pH value. The result is also a clear water soluble product.

We claim:
1. A process of improving the producing of water soluble alkoxylated methylol melamines comprising as the first process step producing polymethylolmelamines by heating in the presence of alkalis 1 mol melamine with 2 to 6 mols paraformaldehyde in the presence of water and isolating produced polymethylol melamines and as the second process step, adding to the isolated polymethylol melamines excessive low univalent aliphatic alcohol and thereupon acidly alkoxylating and neutralizing the solution, the improvement comprising heating without additional water said 1 mol melamine and said 2 to 6 mols paraformaldehyde in 0.4 to 1.2 mol of a bivalent or trivalent alcohol with a total of 2 to 6 carbonatoms, said alcohol being selected from the group consisting of ethylene glycol, diethylene glycol, propylene glycol, dipropylene glycol, butylene glycol, until an opalescent to clear solution is produced and directly thereafter without isolating the produced polymethylolmelamines, as the second step, adding excessive low univalent unsubstituted alkyl alcohol containing 1 to 3 carbon atoms and thereupon alkoxylating in the said manner.

2. A process in accordance with claim 1, wherein up to 60% by weight of said bivalent or tervalent alcohol is exchanged with at least the same amount by weight of said low univalent aliphatic alcohol used for alkoxylation in the second process step.

3. A process in accordance with claim 2, comprising the final process step of distilling off said excessive univalent alcohol.

4. A process in accordance with claim 1, wherein in the first process step 0.7 to 1.1 mols of said bivalent or tervalent alcohol with a total of 2 to 6 carbon atoms are used.

5. A process in accordance with claim 1, wherein in the first process step ethylene glycol is used as said bivalent or tervalent alcohol.

6. A process in accordance with claim 2, wherein in the first process step 10 to 50 parts by weight of said bivalent or tervalent alcohol are exchanged with substantially the double amount by weight of said low univalent alcohol used in the second process step.

References Cited
UNITED STATES PATENTS

| | | | |
|---|---|---|---|
| 3,352,838 | 11/1967 | Toepflet et al. | 260—249.6 XR |
| 3,630,998 | 12/1971 | Schibler | 260—249.6 |
| 3,145,207 | 8/1964 | Wohnsiedler | 260—249.6 |
| 3,488,350 | 1/1970 | Donaldson | 260—249.6 |

JOHN M. FORD, Primary Examiner